United States Patent
Kato et al.

(10) Patent No.: US 7,348,876 B2
(45) Date of Patent: Mar. 25, 2008

(54) OBSTACLE DETECTION DEVICE

(75) Inventors: Koji Kato, Aichi-gun (JP); Masakazu Takeichi, Okazaki (JP); Yoshihisa Sato, Nagoya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 11/220,524

(22) Filed: Sep. 8, 2005

(65) Prior Publication Data

US 2006/0077049 A1 Apr. 13, 2006

(30) Foreign Application Priority Data

Sep. 30, 2004 (JP) ............................. 2004-287923

(51) Int. Cl.
*B60Q 1/00* (2006.01)
*G05D 1/02* (2006.01)

(52) U.S. Cl. ...................................... 340/435; 701/300

(58) Field of Classification Search ................ 340/435, 340/436, 903, 901, 902; 180/167, 267; 701/91, 701/300

See application file for complete search history.

(56) References Cited

U.S. PATENT DOCUMENTS 5,574,426 A * 11/1996 Shisgal et al. .............. 340/435
6,014,601 A    1/2000 Gustafson
6,433,679 B1   8/2002 Schmid
6,724,300 B2 * 4/2004 Miyakoshi et al. ......... 340/435

FOREIGN PATENT DOCUMENTS

| JP | 03-135783 | * 6/1991 |
|----|-----------|----------|
| JP | A-3-135783 | 6/1991 |
| JP | A-7-110900 | 4/1995 |
| JP | A-61-162778 | 7/1996 |
| JP | A-10-166973 | 6/1998 |

* cited by examiner

*Primary Examiner*—Jeffery Hofsass
*Assistant Examiner*—Sigmund Tang
(74) *Attorney, Agent, or Firm*—Posz Law Group, PLC

(57) ABSTRACT

An obstacle detection device for a vehicle notifies the driver of an obstacle approaching rapidly in the rear side by sound when a detected velocity of the obstacle relative to the vehicle is larger than a threshold velocity. It does not notify the driver of the obstacle by sound when the detected relative velocity is smaller than the threshold velocity.

18 Claims, 10 Drawing Sheets

LONG DISTANCE

RAPID APPROACH

75cm-100cm

50cm-75cm

BELOW 50cm

NOT DETECTED

| PATTERN | DISTANCE | SHORT | LONG | |
|---|---|---|---|---|
| | | | OVER VT | BELOW VT |
| 1 | SOUND | ○ | S | ○ |
| | DISPLAY | ○ | S | ○ |
| 2 | SOUND | ○ | S | — |
| | DISPLAY | ○ | S | ○ |
| 3 | SOUND | ○ | — | — |
| | DISPLAY | ○ | S | ○ |
| 4 | SOUND | ○ | S | ○ |
| | DISPLAY | ○ | ○ | ○ |
| 5 | SOUND | ○ | S | — |
| | DISPLAY | ○ | ○ | ○ |

OBSTACLE DETECTION DEVICE

CROSS REFERENCE TO RELATED APPLICATION

This application is based on and incorporates herein by reference Japanese patent application No. 2004-287923 filed on Sep. 30, 2004.

FIELD OF THE INVENTION

The present invention relates to an obstacle detection device for a vehicle, which detects an obstacle around the vehicle and notifies a driver in the vehicle of the obstacle.

BACKGROUND OF THE INVENTION

Conventional obstacle detection devices for a vehicle detect an obstacle around the vehicle by means of a distance sensor and notify the driver in the vehicle of the obstacle. One of the obstacle detection devices (hereafter a first device) changes methods for the notification according to the distance to the obstacle. For example, suppose that the distance between the vehicle and the obstacle varies as shown in graphs (a) and (b) in FIG. 13. The graph (a) shows the distance in terms of time and the graph (b) shows velocity of the obstacle relative to the vehicle in terms of time. If the distance is getting shorter, the relative velocity is positive.

In this case, the first device changes the methods for the notification according to the distance when the distance is below a threshold DT1, as shown in a graph (c) in FIG. 13. The graph (c) in FIG. 13 shows intensity of the notification by the first device in terms of time. For example, the first device produces discrete sounds at long intervals when the distance is long, shortens the intervals as the distance gets shorter and produces continuous sounds when the distance is below ten centimeters. Thus, the driver can recognize the distance from the sounds.

However, as seen in the graph (c), the first device makes the notification even if the distance is getting longer. This sometimes bothers the driver.

Another obstacle detection device in JP-H03-135783A (hereafter a second device) operates in at least two stages. At one of the stages where the obstacle is at a short distance, the second device always makes a notification. At the other stage where the obstacle is at a long distance, the second device makes the notification only if the obstacle is getting closer. For example, as shown in a graph (d), which shows intensity of the notification by the second device in terms of time, the second device always makes the notification if the distance is shorter than a threshold DT2. When the distance is longer than the threshold DT2, it makes the notification only if the distance is getting shorter, as shown in a dashed square in the graph (d). Thus, even when the distance is shorter than the threshold DT1, the notification is not made while the distance is getting longer and the distance is longer than the threshold DT2. This reduces the possibility of bothering the driver.

Further obstacle detection device (hereafter a third device) makes the notification by sound just once when it detects the obstacle at a long distance, subsequently continues the notification by only displaying an warning light on a screen and makes the notification by sound again when the obstacle comes to a close position. For example, as shown in a graph (e), which shows intensity of the notification by the third device in terms of time, the third device makes the notification by sound just once when it detects the obstacle at a distance longer than the threshold DT2, and always makes the notification by sound while the distance is shorter than the threshold DT2. Therefore, the third device does not make the notification by sound in a period within the dashed square in the graph (e) in FIG. 13.

However, the second device always makes the notification if the distance is between the thresholds DT1 and DT2 and the obstacle is getting closer. Therefore, the second device makes the notification even if the obstacle is approaching the vehicle slowly. Thus, the second device still has the possibility of bothering the driver.

On the other hand, once the third device first notifies the driver of the obstacle at a long distance by sound, it never makes the notification by sound again until the distance becomes shorter than the threshold DT2. Therefore, even if the obstacle is approaching the vehicle rapidly after the first notification, the third device may fail to notify the driver of such a situation.

SUMMARY OF THE INVENTION

It is therefore an object of the present invention to provide an obstacle detection device for a vehicle which reduces the possibility of bothering the driver by the notification and notifies of the rapid approach of the vehicle properly.

An obstacle detection device for a vehicle of the present invention determines a distance between the vehicle and an obstacle and obtains velocity-related information related to velocity of the vehicle. In addition, the obstacle detecting device notifies of the obstacle in a first method if the distance is shorter than a threshold distance, and notifies of the obstacle in a second method according to rapidness of approach of the obstacle to the vehicle which is indicated by the velocity-related information if the distance is shorter than the threshold distance.

Thus, when the obstacle is approaching at a distance longer than the threshold distance, the obstacle detection device can change the method of notification according to the rapidness of the approach.

BRIEF DESCRIPTION OF THE DRAWINGS

The invention, together with additional objective, features and advantages thereof, will be best understood from the following description, the appended claims and the accompanying drawings in which:

DETAILED DESCRIPTION OF THE INVENTION

Figure 1:
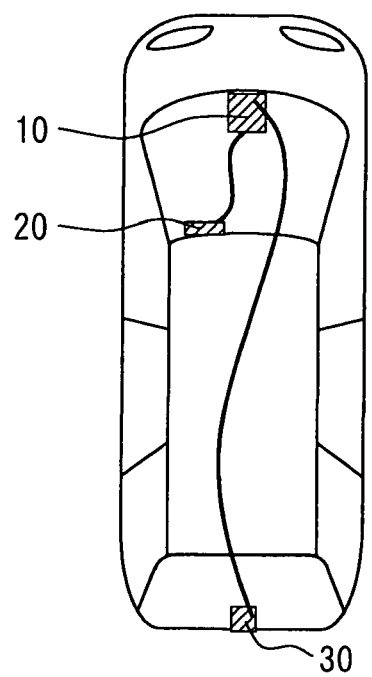
FIG. 1 shows an obstacle detection device installed in a vehicle according to an embodiment of the present invention.

As shown in FIG. 1, an obstacle detection device installed in a vehicle has a processing unit 10, a notification device 20 and an ultrasonic sensor 30. The processing unit 10, notification device 20, and ultrasonic sensor 30 are installed in the instrument panel, at the front glass (not illustrated), and at a rear end of the vehicle, respectively.

The processing unit 10 includes a CPU, a memory and an input/output interface. The CPU sends various control signals to the notification device 20 and the ultrasonic sensor 30 through the input/output interface. In addition, the processing unit 10 is connected with a vehicle speed sensor and a shift position sensor which are not illustrated in FIG. 1.

Specifically, at a time of detecting an obstacle around the vehicle, the processing unit 10 sends a signal to the ultrasonic sensor 30 for instructing to transmit an ultrasonic wave to the outside of the vehicle and receive the reflected ultrasonic wave. The processing unit 10 may determine it is the time to send the signal when the unit 10 detects according to the speed sensor and a shift position sensor that the current shift position is REVERSE and the current speed of the vehicle is below 10 km/h.

The processing unit 10 also receives the reflected wave from the ultrasonic sensor 30 and calculates at the CPU a distance to an obstacle which reflected the wave. When the calculated distance is shorter than a predetermined distance, the processing unit 10 calculates velocity of the obstacle relative to the vehicle according to time-dependent change of the calculated distance. When the distance is getting shorter, the relative velocity is positive. If the calculated velocity is larger than a predetermined velocity, the processing unit 10 sends a signal to the notification device 20 for instructing to notify a driver of the obstacle.

The ultrasonic sensor 30 has a communication unit, a pulse generation unit and a microphone, which are not illustrated in FIG. 1. The communication unit exchanges various signals with the processing unit 10. The pulse generation unit generates an ultrasonic pulse. The microphone transmits the ultrasonic wave and receives the reflected ultrasonic wave.

Specifically, when the communication unit receives the signal for instructing to transmit and receive the ultrasonic wave from the processing unit 10, the pulse generator generates a predetermined ultrasonic pulse. Then the microphone receives the pulse and makes its piezoelectric element and diaphragm vibrate. The vibration makes the ultrasonic wave. In addition, the microphone receives the reflected wave of the transmitted wave, and the communication unit transmits the reflected wave to the processing unit 10. The ultrasonic sensor 30 may be installed in other portions of the vehicle depending on its purpose.

The notification device 20 includes a speaker and a display screen which are not illustrated and notifies the driver of the obstacle according to the instruction signal from the processing unit 10. Specifically, as shown in FIGS. 2C-2E, when the processing unit 10 detects that the obstacle is within 100 cm from the vehicle, it makes the notification device 20 notify the driver of the obstacle by discrete sounds, changing intervals of the sounds according to the detected distance to the obstacle. At the same time, as shown in FIGS. 3C-3E, the processing unit 10 makes the notification device 20 display location information of the obstacle on the screen. Thus, when the obstacle is within 100 cm from the vehicle, the driver can recognize the location of the obstacle even if the drive cannot see it directly.

Figure 2A:
FIG. 2A shows a method of notification by sound in a case where the obstacle is at a long distance.
Figure 2B:
FIG. 2B shows a method of notification by sound in a case where the obstacle is approaching rapidly.
Figure 2C:
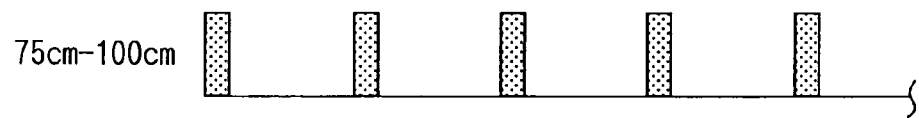
FIG. 2C shows a method of notification by sound in a case where the obstacle is in a distance range from 75 cm to 100 cm.
Figure 2D:
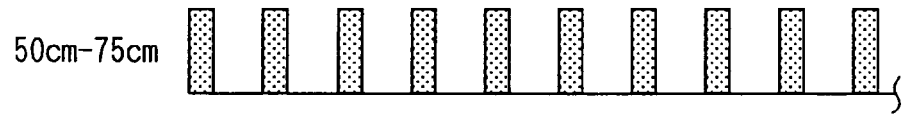
FIG. 2D shows a method of notification by sound in a case where the obstacle is in a distance range from 50 cm to 75 cm.
Figure 2E:
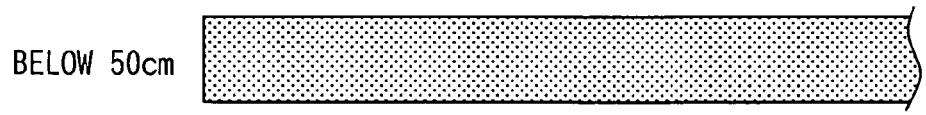
FIG. 2E shows a method of notification by sound in a case where the obstacle is in a distance range below 50 cm.
Figure 3A:
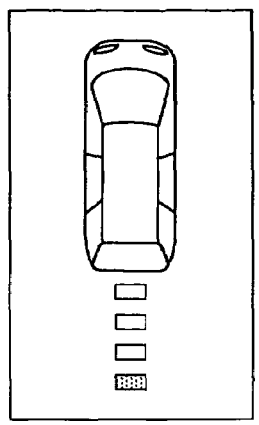
FIG. 3A shows a method of notification on screen in a case where the obstacle is at a long distance.
Figure 3B:
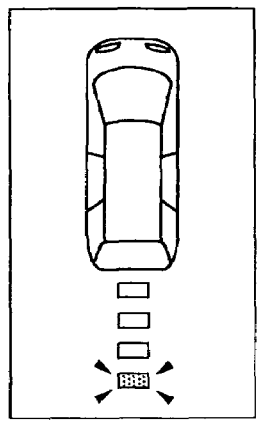
FIG. 3B shows a method of notification on screen in a case where the obstacle is approaching rapidly.
Figure 3C:
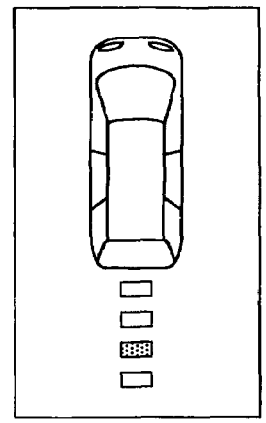
FIG. 3C shows a method of notification on screen in a case where the obstacle is in a distance range from 75 cm to 100 cm.
Figure 3D:
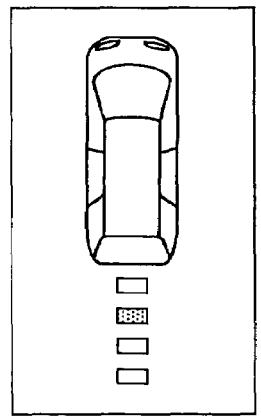
FIG. 3D shows a method of notification on screen in a case where the obstacle is in a distance range from 50 cm to 75 cm.
Figure 3E:
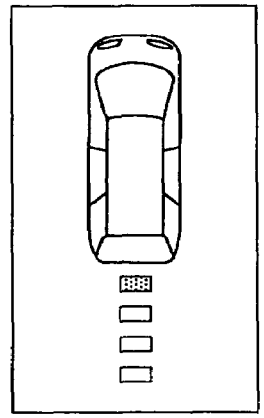
FIG. 3E shows a method of notification on screen in a case where the obstacle is in a distance range below 50 cm.
Figure 3F:
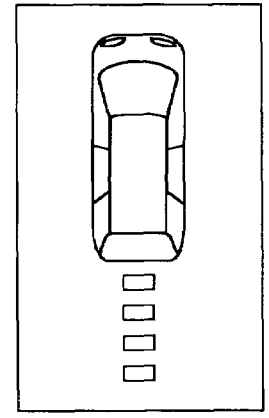
FIG. 3F shows a method of notification on screen in a case where the obstacle is not detected.

In addition, when the processing unit 10 detects that the obstacle is 100-200 cm away from the vehicle, it can make the notification device 20 notify once as shown in FIG. 2A and FIG. 3A and afterward change methods of notification as shown in FIG. 2B and FIG. 3B if the obstacle is approaching rapidly.

Hereafter, with reference to FIGS. 4, 5 and 6, notification process executed by the processing unit 10 will be described in detail with respect to two occasions, that is, when the obstacle is approaching the vehicle rapidly at a long distance or when the obstacle is at a short distance. In this embodiment, a threshold to distinguish short distances and long distances is set to 100 cm and the upper limit of the long distances for notification is set to 200 cm. Thus, the obstacle is in a short distance range if it is within 100 cm from the vehicle and it is in a long distance range if it is in a location 100-200 cm away from the vehicle.

Figure 4:
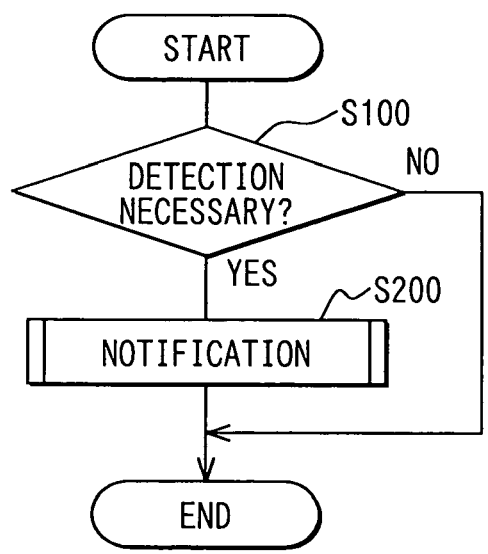
FIG. 4 shows a flowchart of a process executed when the obstacle detection device activates.

The processing unit 10 executes the process shown in FIG. 4 (hereafter main process) repeatedly. In each execution, the processing unit 10 first determines whether it is necessary to detect the obstacle at step S100. Specifically, the processing unit 10 determines whether the vehicle speed is below 10 km/h and the vehicle is moving backward, according to the vehicle speed sensor and the shift position sensor. If the determination is YES (detection necessary) the processing unit 10 executes step S200 and executes notification process. If the determination is NO (detection not necessary), the processing unit 10 terminates the execution of the main process for this time.

Figure 5:
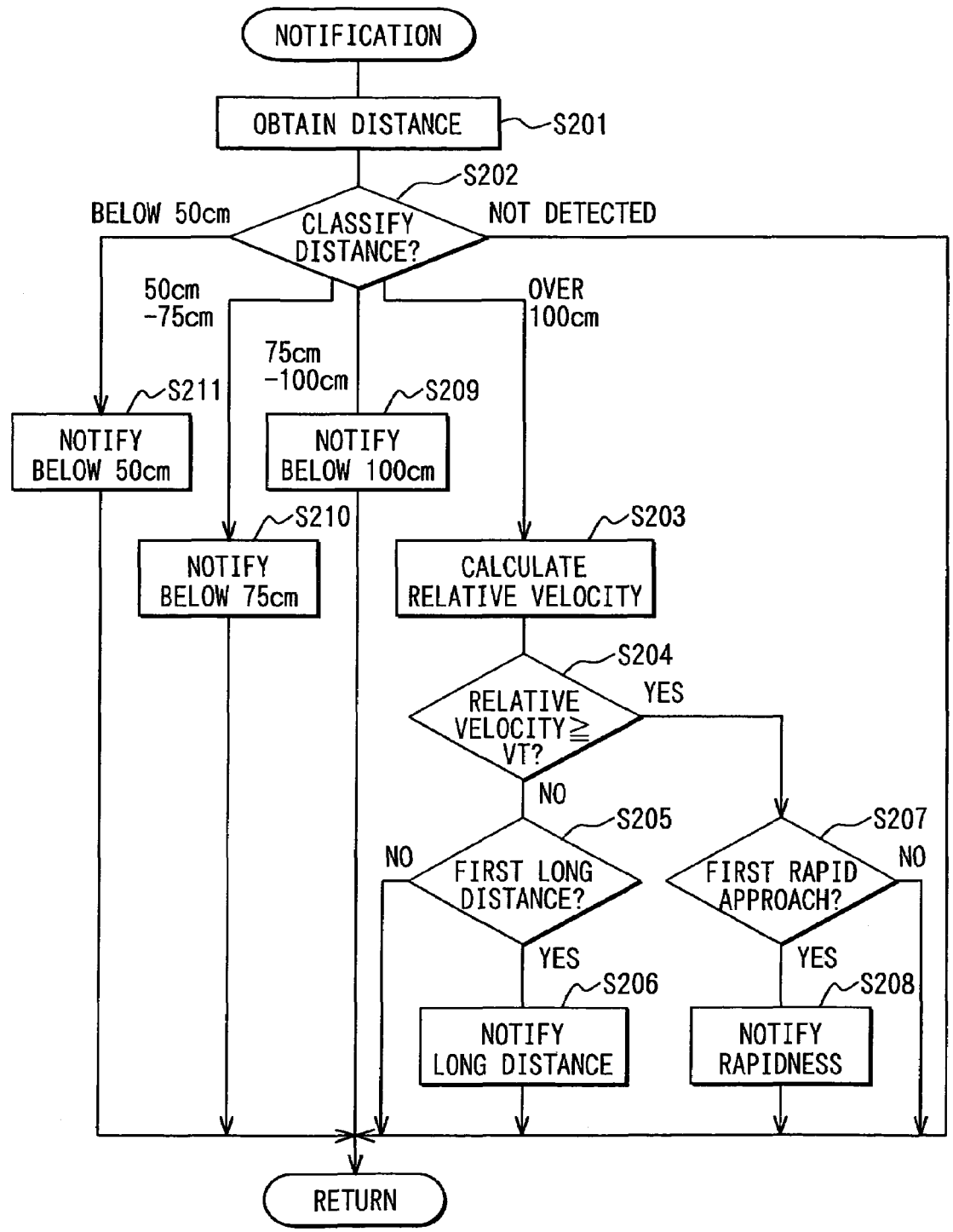
FIG. 5 shows a flowchart of a process for obtaining a distance and notifying of the obstacle.
Figure 6:
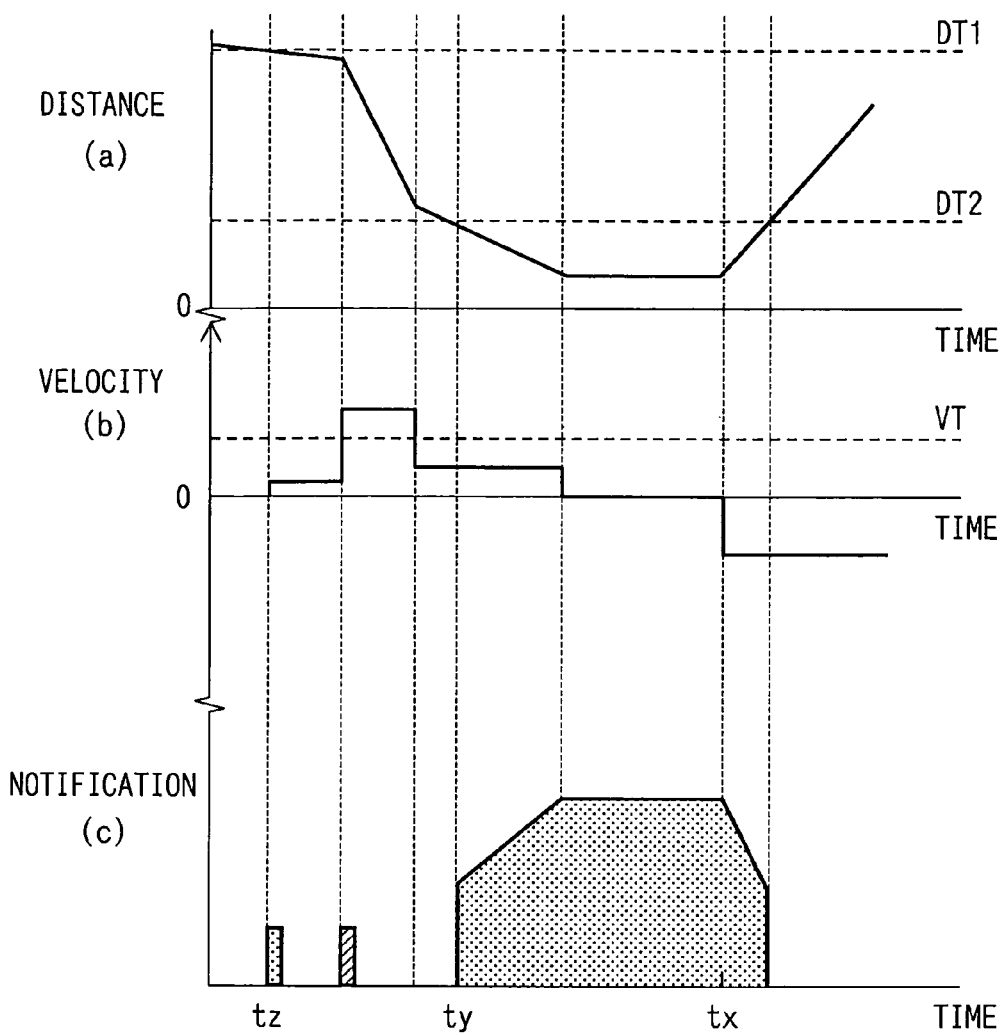
FIG. 6 shows a timing chart of the distance and relative velocity of the obstacle and the notification.

As shown in FIG. 5, in the NOTIFICATION process of step S200, the processing unit 10 obtains information on the current distance to the obstacle at step S201. Specifically, as described above, the processing unit 10 makes the ultrasonic sensor 30 transmit the ultrasonic wave and receive the reflected ultrasonic wave and calculates the distance according to the reflected wave.

Subsequently at step S202, the processing unit 10 classifies the calculated distance into one of four ranges and after the step S202 executes the notification in a method corresponding to a range the distance belongs to. If the processing unit 10 cannot obtain the information on the distance, the notification is not made and processing unit 10 terminates executing the main process for this time.

If the distance belongs to a range from 100 cm to 200 cm (i.e. long distance range), the processing unit 10 executes step S203. At the step S203, the processing unit 10 calculates the velocity of the obstacle relative to the vehicle. The calculation of the relative velocity is made according to a change of the distance calculated at S201 through executions of the main process. Subsequently at step S204, the processing unit 10 determines whether the relative velocity is larger than a predetermined velocity VT. If the determination is NO (slower), the processing unit 10 determines at step S205 whether the distance obtained at step S201 is the first one after the obstacle entered the long distance range.

The determination of step S205 may be made according to a flag in the memory. The processing unit 10 turns the flag to ON after each of steps S206 and S207 and turns it to OFF after each of steps S211, S210 and S209. The flag may be turned to OFF when the engine stops or main power supply of the vehicles stops. Therefore, if the flag is OFF, the determination of step S205 becomes YES, and vice versa. If the determination of step 205 is YES (first time), the processing unit 10 makes the notification device 20 notify the driver of the obstacle being at a long distance. Specifically, as shown in FIG. 2A and FIG. 3A, at time tz the processing unit 10 makes the notification device 20 produce a buzzer sound just once and turn on an indicator on the screen which is at the farthermost place from a vehicle mark. If the determination of step S205 is NO (not first time), that is, if the notification device 20 already has notified of the obstacle being at a long distance, the notification by sound is not made and the processing unit 10 terminates the execution of the main process for this time.

Thus, through a continuous period where the obstacle is approaching more slowly than the predetermined velocity VT, the notification by sound is made just once. This will reduce the possibility of bothering the driver by notification sounds. Because the display on the screen will not bother the driver, the processing unit 10 regularly notifies the driver of the obstacle being at a long distance, irrespective of the determination of step S205.

If the determination of step S204 is YES (faster), then the processing unit 10 determines at step S207 whether the relative velocity obtained at step S204 is the first velocity after the velocity exceeded the predetermined velocity VT. The determination in step S207 may be made according to a flag in the memory, which the processing unit 10 turns to ON after step S208 and turns to OFF after each of steps S211, S210, S209 and S205. The flag may be turned to OFF when the engine stops or main power supply of the vehicle stops. Therefore, if the flag is OFF, the determination of step S207 becomes YES, and vice versa.

If the determination of step S207 is YES (first time), then the processing unit 10 makes the notification device 20 notify the driver of the obstacle approaching rapidly at step S208. Specifically, as shown in a FIG. 2B and FIG. 3B, the processing unit 10 makes the notification device 20 produces a set of discrete sounds with short duration at short intervals and makes an indicator on the screen blink at the farthermost place from a vehicle mark. Thus, the driver recognizes that the obstacle is approaching rapidly.

If the determination of step S207 is NO (not first time), that is, if the notification device 20 already has notified the driver of the obstacle approaching rapidly, the notification by sound is not made and the processing unit 10 terminates the execution of the main process for this time. Thus, through a continuous period where the obstacle is approaching more rapidly than the predetermined velocity VT, the notification by sound is made just once. This will reduce the possibility of bothering the driver by notification sounds. Because the display on the screen will not bother the driver, the processing unit 10 notifies the driver regularly of the obstacle approaching rapidly, irrespective of the determination of step S207.

If the processing unit 10 determines that the obstacle comes at a location below 100 cm from the vehicle at step S202, it makes the notification device 20 notify the driver of the obstacles at step S209-S211 according to the calculated distance. Specifically, as shown in FIGS. 2C-2E, intervals between sounds for notification become shorter as the distance becomes shorter. Especially, if the distance becomes shorter than 50 cm, the sounds become continuous. Thus, even if the driver cannot see the obstacle directly, the driver can recognize the change of distance thereof by the change in pattern of the sounds. In addition, as seen in FIGS. 3C-3E, the processing unit 10 also makes the notification device 20 display one of indicators according to the distance on the screen. Thus, the driver can recognize the location of the obstacle more exactly.

As described above, the obstacle detection device distinguishes the long distance range from the short distance range by the threshold distance. While the device is detecting the obstacle in the long distance range, it notifies the driver of the obstacle once by sound. It also distinguishes the rapid approach by the threshold relative velocity VT. When the device detects the obstacle rapidly approaching in the long distance range, it notifies the driver of the obstacle approaching rapidly. In addition, when the device detects the obstacle in the short distance range, it notifies the driver of the obstacle in different manners depending on the distance. Thus, the device can reduce the possibility to bother the driver and notify the driver of the obstacle approaching rapidly on time.

The present invention should not be limited to the embodiment discussed above and shown in the figures, but may be implemented in various ways without departing from the spirit of the invention.

For example, the notification device 20 may make the notification in a manner other than the ones shown in FIGS. 2A-2E and FIGS. 3A-3F. Specifically, the notification device 20 may produce voices like "An obstacle is at a distance over 1 m.", "Be careful! An obstacle is approaching rapidly.", "It is 75 cm to the obstacle." and "Caution! The obstacle is hitting the vehicle!"

In addition, at step S201, the processing unit 10 may determine the distance to the obstacle according to an interval between transmission of an ultrasonic wave and reception of the reflected ultrasonic wave, because the interval is proportional to the distance.

In addition, the ultrasonic sensor 30 may include a unit for calculating the distance to the obstacle. The processing unit 10 may have the pulse generation unit. The ultrasonic sensor 30 as a distance sensor may be replaced with other sensors such as an infrared sensor and a radio wave sensor.

In addition, the upper limit of the long distances may be more than 200 cm. For example, the limit may be 500 cm.

Moreover, the following modifications can be made to the above embodiment.

(Modification 1)

Figure 7:
FIG. 7 shows a timing chart of the periodic notification when the obstacle is approaching rapidly.
Figure 8:
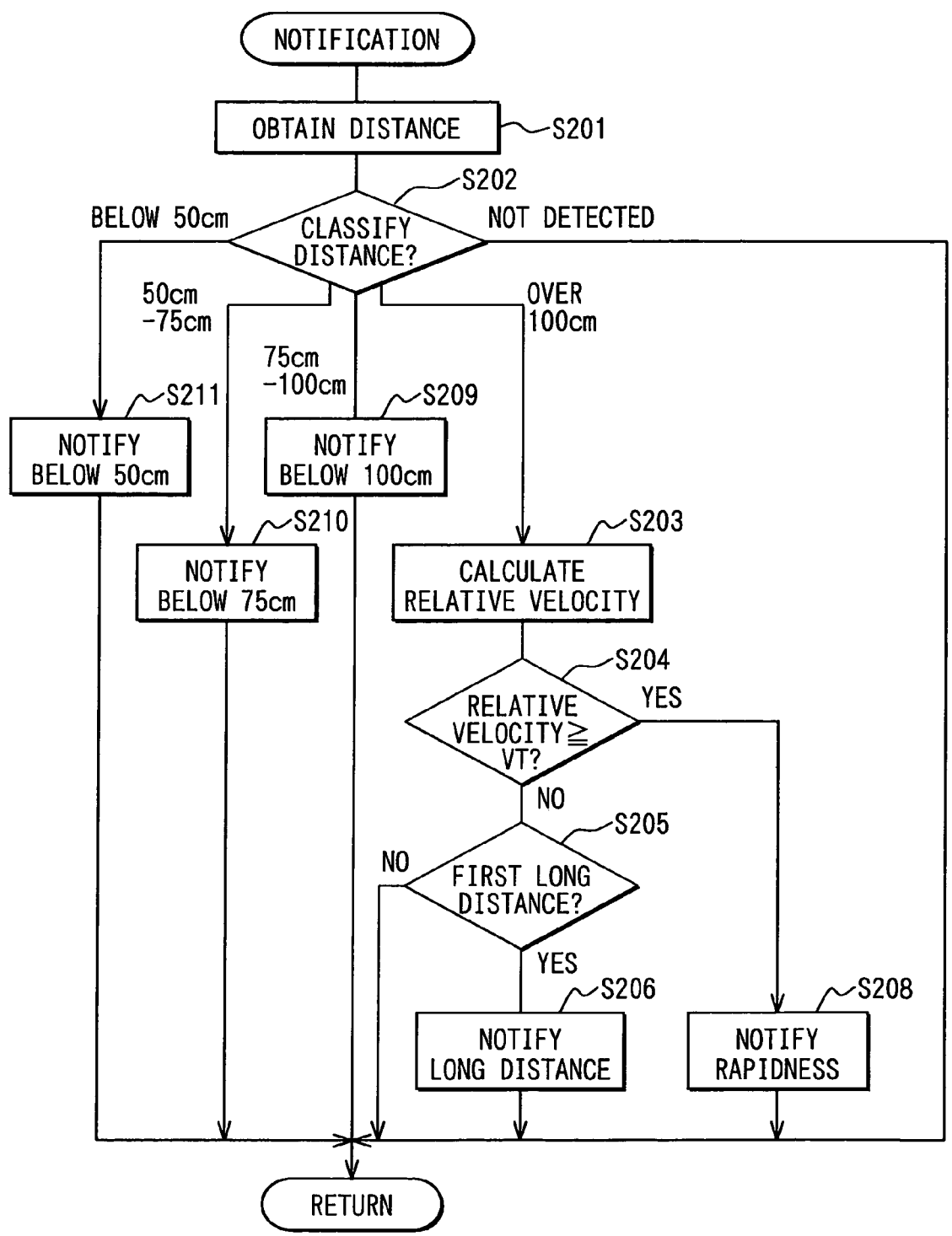
FIG. 8 shows a flowchart of a process for obtaining a distance and notifying of the obstacle in Modification 1.
Figure 9:
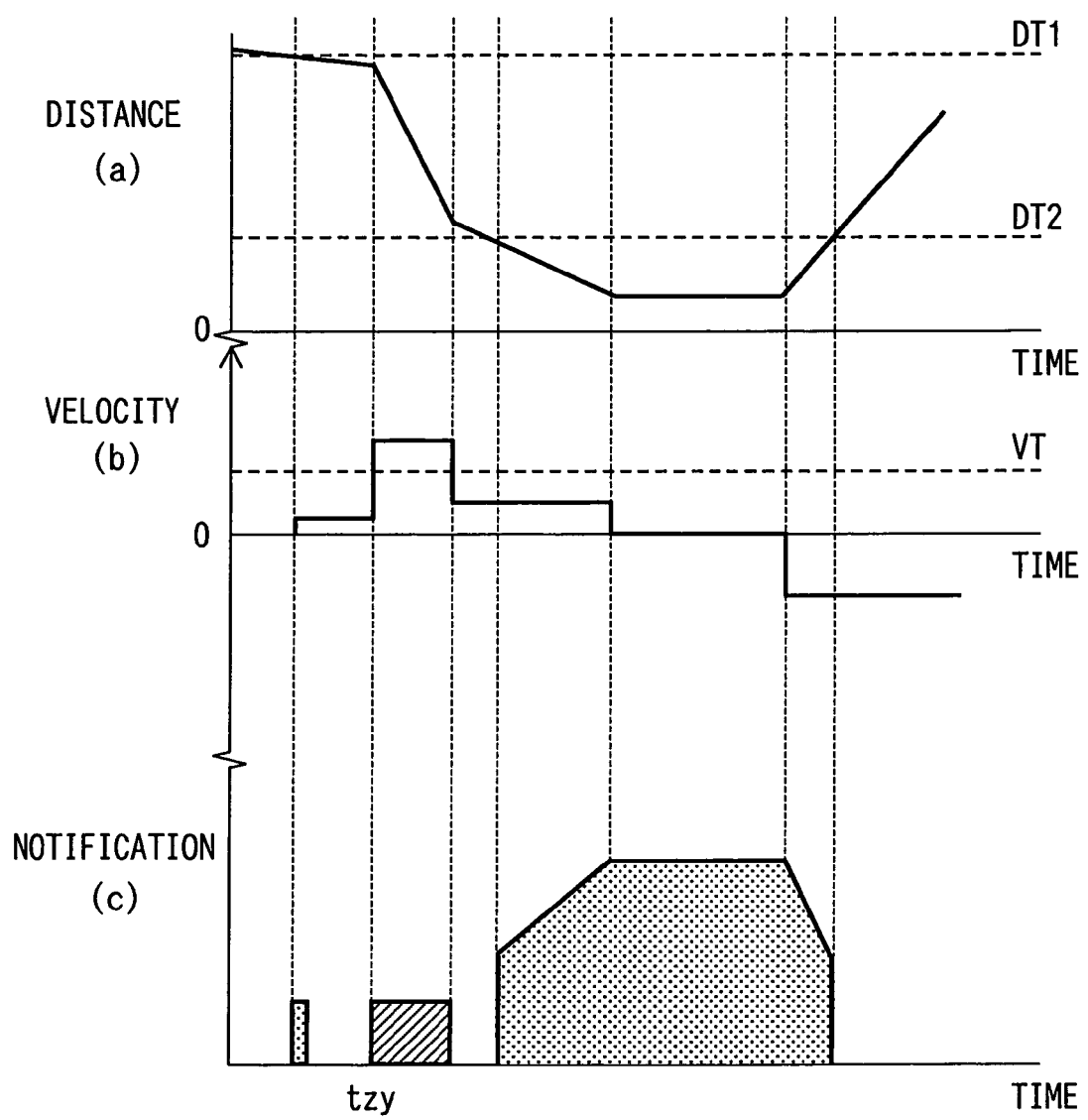
FIG. 9 shows a timing chart of the distance and relative velocity of the obstacle and the notification in Modification 1.

The processing unit 10 may always make the notification device 20 notify by sound while the relative velocity exceeds the threshold velocity VT. Thus, the driver is notified the driver more intensively of the obstacle approaching rapidly. Specifically, as shown in FIG. 7, the processing unit 10 may make notification device 20 produce multiple sets of discrete sounds with short duration and short intervals, wherein each set is produced periodically. In this case the processing unit 10 executes the NOTIFICATION process according to the flowchart in FIG. 8 which is different from the flowchart in FIG. 5 in that step S207 is omitted. Thus, if the determination of step S204 is YES, the processing unit 10 always makes the notification device 20 notify the driver of the obstacle approaching rapidly (see steps S204 and S208). Thus, as shown in FIG. 9, the processing unit 10 may make notification device 20 produce sounds regularly from time tzy while the relative velocity exceeds the threshold velocity VT.

(Modification 2)

The processing unit 10 may calculate acceleration of the obstacle relative to the vehicle at S203 in place of the relative velocity, and determine at step S204 whether the relative acceleration is larger than an acceleration threshold. Thus, the processing unit 10 may determine whether the obstacle is rapidly approaching according to the relative acceleration.

Moreover, the processing unit 10 may determine whether the obstacle is approaching rapidly according to velocity or acceleration of the vehicle relative to the ground (hereafter absolute velocity or absolute acceleration, respectively). This method of determination works better when the obstacle is not moving. Besides, in many cases, the absolute velocity or the absolute acceleration can be calculated more exactly than the relative velocity or the relative acceleration which is obtained through time derivative and sensitive to fluctuations in the ultrasonic wave.

Figure 10:
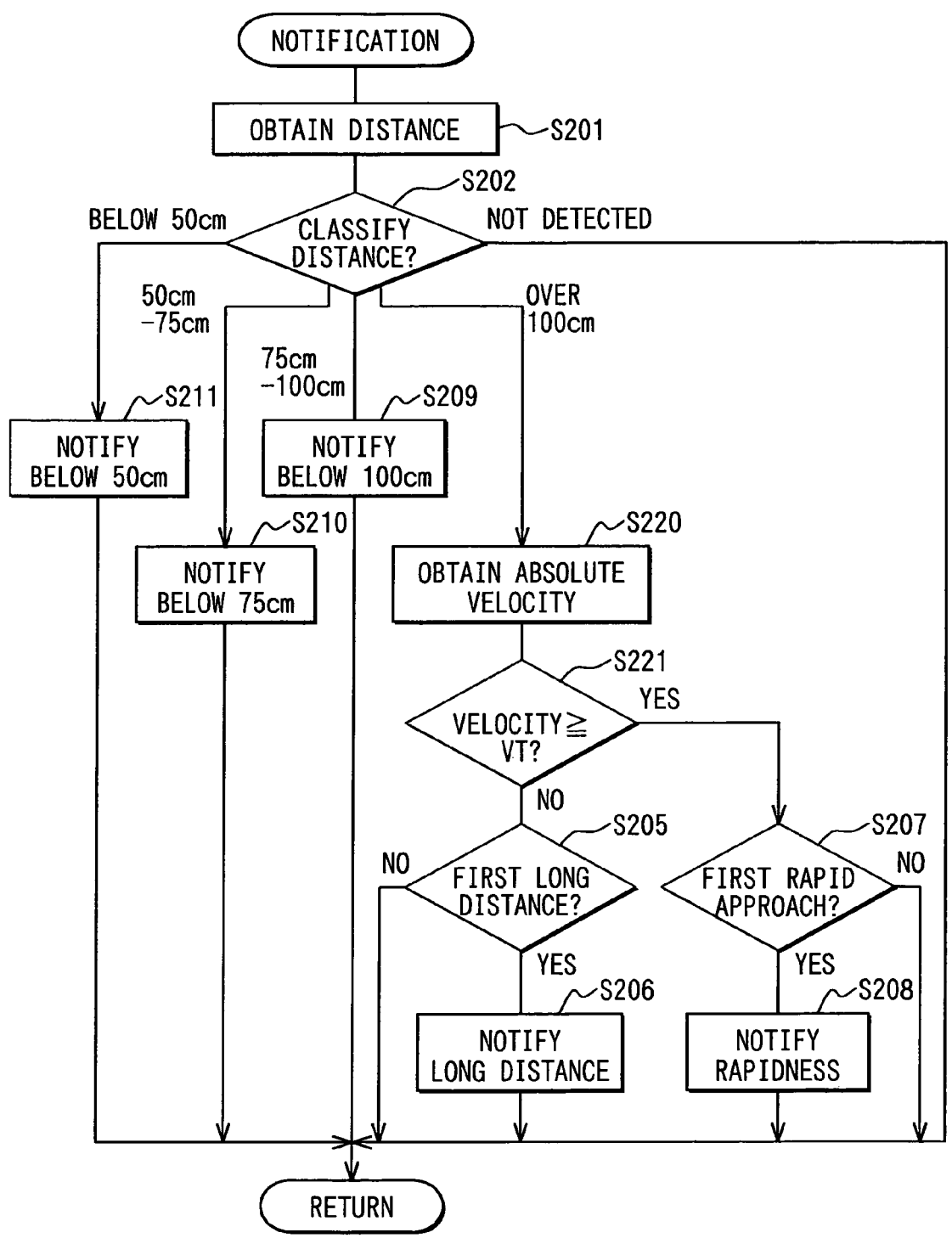
FIG. 10 shows a flowchart of a process for obtaining a distance and notifying of the obstacle in Modification 2.

In this case, the processing unit 10 may specify the absolute velocity or the absolute acceleration according to the signal from the vehicle speed sensor and executes a process shown in FIG. 10. The process differs from the process shown in FIG. 5 in that the processing unit 10 executes steps S220 and S221 in place of steps S203 and S204, respectively. Thus, when the processing unit 10 detects the obstacle in the long distance range, it obtains the absolute velocity from the vehicle speed sensor at step S220. Subsequently at step S221, it determines whether the obtained velocity is larger than the threshold velocity VT. If the determination is YES, it makes notification device 20 notify the driver of the obstacle approaching rapidly at step S208.

(Modification 3)

The obstacle detection device of the above embodiment may accept various adjustments made by the driver. For example, the threshold to distinguish the long distance range and the short distance range can be adjusted by the driver according to the driver's preference. In addition, the processing unit 10 may accept the driver's adjustment regarding sub-thresholds (50, 75 and 100 cm in the above embodiment) to divide the short distance range into three to change the methods of the notification according to the sub-thresholds. In addition, the threshold velocity VT may be adjusted by the driver according to the driver's preference.

Figures 11, 12:
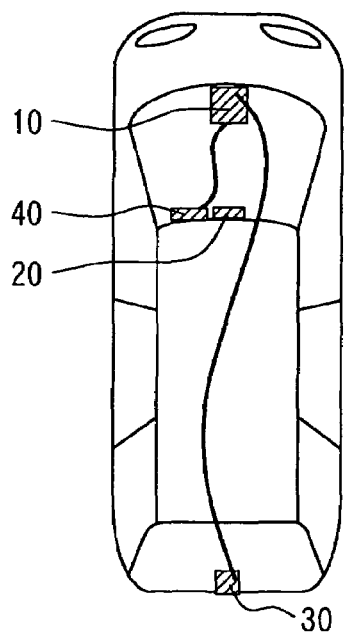
FIG. 11 shows an obstacle detection device installed in a vehicle in Modification 3.
FIG. 12 shows combination patterns of the notification methods in Modification 4.
Figure 13:
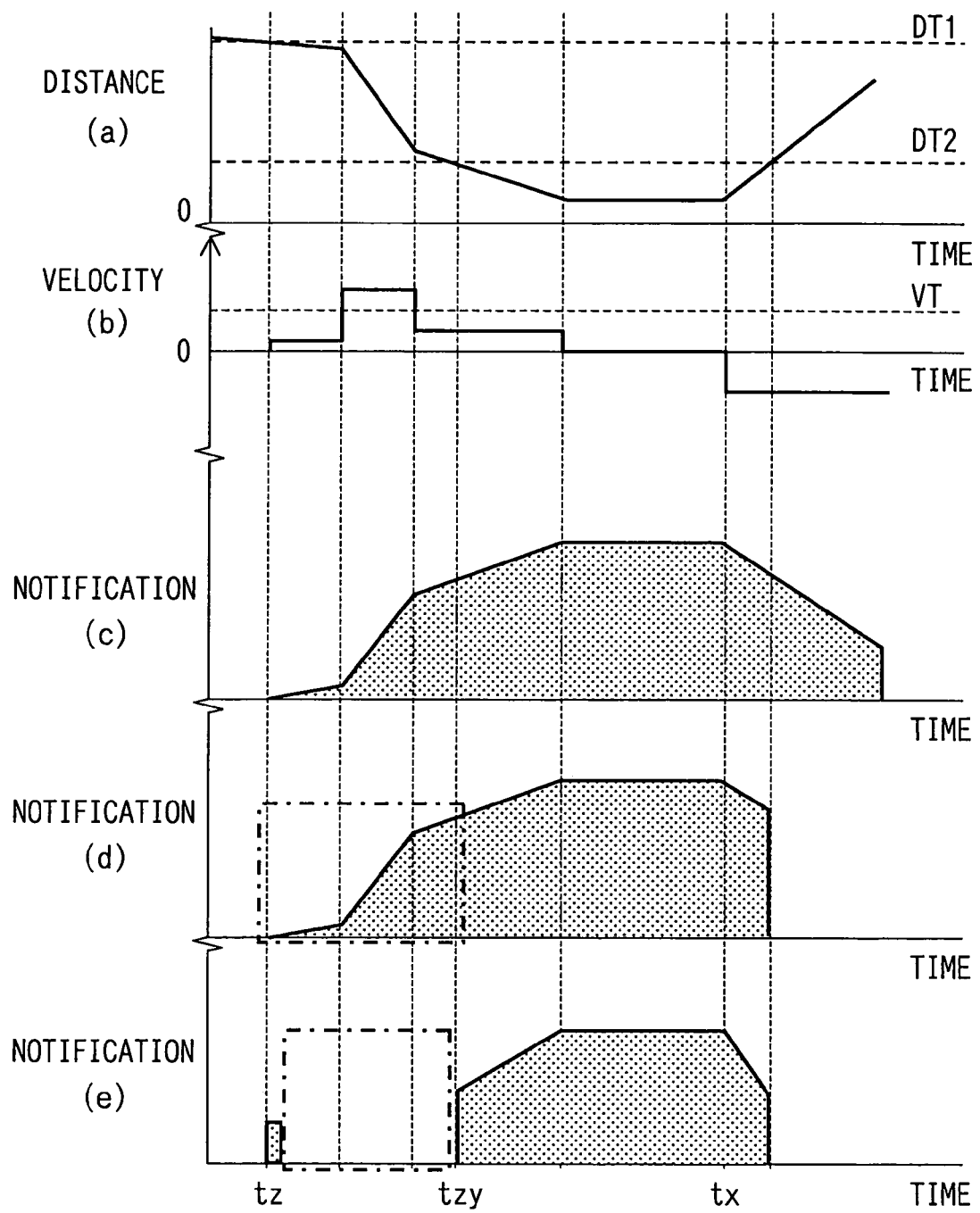
FIG. 13 shows a timing chart of the distance and relative velocity of the obstacle and the notifications by conventional obstacle detecting devices.

In this case, as shown in FIG. 11, the obstacle detection device may have a Human Machine Interface (HMI) 40 and the processing unit 10 may have a storage device to memorize the adjustments the driver has made by means of the HMI 40. Thus, the device can make the notification in accordance with the driver's preferences.

In addition, the device may learn the driver's preferences through daily operations of the driver to the HMI 40 and make adjustments according to the learned preference. For example, the processing unit 10 may make the storage device memorize the shortest distance to the obstacle during each period which starts when the obstacle detection device is activated and ends when the vehicle stops and the device is deactivated. Then the processing unit 10 may make the adjustments to the threshold distances and sub-thresholds according to the shortest distances. If the driver tends to park the vehicle at closer position to the obstacle, the driver will be bothered more by the notification which is given when the obstacle is at a long distance. Therefore, processing unit 10 may decrease the threshold distances and the sub-thresholds if the memorized shortest distances tend to be shorter. For example, the threshold distances and the sub-thresholds may be determined according to an average of the three shortest times that belong to five shortest times of the last five periods and that are neither the shortest nor the longest of the five.

The device 10 may also learn the driver's preferences and adjust the threshold velocity VT in the same maimer. The vehicle is more likely to crash when it is moving faster. Therefore, processing unit 10 may decrease the threshold velocity VT if values regarding the absolute velocity or the relative velocity memorized in the storage device tend to be larger, to give the notification to the driver before the current velocity becomes too large.

For example, the processing unit 10 may make the storage device memorize the largest velocity to the obstacle during each period which starts when the obstacle detection device is activated and ends when the vehicle stops and the processing unit 10 is deactivated. Then the processing unit 10 may determine the threshold velocity VT according to an average of the three largest velocities that belong to five largest velocities of the last five periods and that are neither the smallest nor the largest of the five.

Besides, the processing unit 10 may make notification device 20 display the adjusted settings. Thus, the driver can recognize the location and the approaching speed of the obstacle more exactly.

(Modification 4)

In addition, the processing unit 10 may always make the notification device 20 notify by sound even if the obstacle is in the long distance range and the relative velocity is smaller than the threshold velocity VT. In this case, the processing unit 10 may make the notification device 20 produce the sounds in different methods so that the driver can distinguish whether the relative velocity is over the threshold velocity VT.

In addition, the processing unit 10 may prohibit the notification device 20 from producing a sound and make it only display on the screen to reduce the possibility of bothering the driver.

In addition, the processing unit 10 may make the notification device 20 just turn on an indicator in place of making the indicator blink when the obstacle is approaching faster than the threshold velocity VT.

As described above, combination patterns of the notification methods varies as listed in the table in FIG. 12. Each circle in the table shows a normal notification method such as the discrete sounds. Each "S" in the table shows a notification method which can be distinguished from the regular notification method. The processing unit 10 may store adjustment to the patterns made by the driver through the HMI 40 and notify the driver accordingly.

What is claimed is:

1. An obstacle detection device for a vehicle, comprising:
   a distance determination means for determining a distance between the vehicle and an obstacle;
   a velocity obtainment means for obtaining velocity-related information related to velocity of the vehicle; and
   a notification means for notifying of the obstacle in a first method if the distance is shorter than a threshold distance, and notifying of the obstacle in a second method according to rapidness of approach of the obstacle to the vehicle which is indicated by the velocity-related information if the distance is longer than the threshold distance,
   wherein the notification means includes a display means and a sound means, which are configured, in the second method, to operate such that
   when the velocity-related information indicates a relative speed of more than a rapidness threshold, the display means displays an image indicating that the obstacle is approaching rapidly, and the sound means generates a sound in a first pattern indicating the rapid approach of the obstacle only in a case that the rapid approach is determined for the first time, and
   when the velocity-related information indicates a relative speed of less than the rapidness threshold, the display means displays an image indicating that the obstacle is away from the vehicle, and the sound means generates a sound in a second pattern indicating that the obstacle is away only in a case that the obstacle is detected for the first time, the second pattern being different from the first pattern.

2. The obstacle detection device according to claim 1, wherein the first method and the second method are different.

3. The obstacle detection device according to claim 1, wherein the velocity-related information indicates acceleration of the obstacle toward the vehicle relative to the vehicle.

4. The obstacle detection device according to claim 1, wherein the velocity-related information indicates either of velocity and acceleration of the vehicle relative to the ground.

5. The obstacle detection device according to claim 1, further comprising a storage means for storing the distances determined at a past plurality of times, wherein the notification means determines the threshold distance according to the stored distances.

6. The obstacle detection device according to claim 5, wherein the notification means is configured so that a user is able to determine and select the threshold distance.

7. The obstacle detection device according to claim 5, wherein the notification means displays the threshold distance.

8. The obstacle detection device according to claim 1, wherein the notification means is configured so that a user is able to determine and select a means of user notification for the second method.

9. The obstacle detection device according to claim 1, further comprising a storage means for storing the velocity-related information obtained at a past plurality of times, wherein the notification means determines the rapidness threshold according to the stored distances.

10. The obstacle detection device according to claim 1, wherein the notification means is configured so that a user is able to determine and select the rapidness threshold.

11. The obstacle detection device according to claim 9, wherein the notification means displays the rapidness threshold.

12. The obstacle detection device according to claim 1, wherein the distance determination means determines the distance according to the velocity of the vehicle.

13. The obstacle detection device according to claim 1, wherein the notification means notifies of the obstacle in the first method depending on where the obtained distance is in a plurality of distance ranges, wherein the distance ranges are distinguished from each other by sub-thresholds.

14. The obstacle detection device according to claim 13, further comprising a storage means for storing the distances obtained at a past plurality of times, wherein the notification means determines the sub-thresholds according to the stored distances.

15. The obstacle detection device according to claim 13, wherein the notification means is configured so that a user is able to determine and select the sub-thresholds.

16. The obstacle detection device according to claim 13, wherein the notification means displays the sub-thresholds.

17. An obstacle detection device for a vehicle, comprising:
    a distance detector adapted to be provided at a rear side of a vehicle, for determining a distance between the vehicle and an obstacle;
    a notifying device for notifying a user of the obstacle; and
    a controller for determining velocity-related information related to velocity of the vehicle and making the notifying device notify of the obstacle in a first method if the distance is shorter than a threshold distance, and notify of the obstacle in a second method according to the rapidness of approach of the obstacle to the vehicle which is indicated by the velocity-related information if the distance is longer than the threshold distance,
    wherein the controller is programmed to control the notifying device, in the second method, such that
    when the velocity-related information indicates a rapid approach of the obstacle at a rate more than a rapidness threshold, the notifying device displays an image in a blinking manner to indicate that the obstacle is approaching rapidly, and generates a set of a plurality of sounds immediately after the rapid approach is determined for the first time, and
    when the velocity-related information indicates a normal approach at a rate of less than the rapidness threshold, the notifying device displays an image in an non-blinking manner to indicate that the obstacle is away from the vehicle, and generates a single sound immediately after the obstacle is detected for the first time.

18. The obstacle detection device of claim 17,
    wherein the plurality of sounds is generated only when the rapid approach is determined for the first time, and
    wherein the single sound is generated only when the obstacle is detected for the first time.

* * * * *